(12) United States Patent
Fanton et al.

(10) Patent No.: US 11,396,387 B2
(45) Date of Patent: Jul. 26, 2022

(54) METHOD FOR VERIFYING THE PRESENCE OF EQUIPMENT ON BOARD AN AIRCRAFT, AND ASSOCIATED DEVICE

(71) Applicant: SAFRAN ELECTRONICS & DEFENSE, Boulogne-Billancourt (FR)

(72) Inventors: Nicolas Fanton, Moissy-Cramayel (FR); Nicolas Lipari, Moissy-Cramayel (FR); Pierre-Jean Tine, Moissy-Cramayel (FR); Emmanuel Couturier, Moissy-Cramayel (FR); Alexandre Artault, Moissy-Cramayel (FR)

(73) Assignee: SAFRAN ELECTRONICS AND DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/294,075

(22) PCT Filed: Nov. 14, 2019

(86) PCT No.: PCT/FR2019/052708
§ 371 (c)(1),
(2) Date: May 14, 2021

(87) PCT Pub. No.: WO2020/099795
PCT Pub. Date: May 22, 2020

(65) Prior Publication Data
US 2022/0009652 A1    Jan. 13, 2022

(30) Foreign Application Priority Data

Nov. 16, 2018 (FR) ........................... 1871562

(51) Int. Cl.
*B64F 5/60* (2017.01)
*B64D 11/06* (2006.01)

(52) U.S. Cl.
CPC ............ *B64F 5/60* (2017.01); *B64D 11/0631* (2014.12)

(58) Field of Classification Search
CPC .............................. B64F 5/60; B64D 11/0631
See application file for complete search history.

(56) References Cited

U.S. PATENT DOCUMENTS

| 7,545,274 B2 * | 6/2009 | Coop | ..................... G06Q 10/06 |
| | | | 340/572.1 |
| 7,551,086 B2 * | 6/2009 | Coop | ..................... G06Q 50/30 |
| | | | 340/572.1 |

(Continued)

FOREIGN PATENT DOCUMENTS

| EP | 2 763 075 A3 | 12/2015 |
| EP | 3 070 648 A1 | 9/2016 |

(Continued)

*Primary Examiner* — Mussa A Shaawat
(74) *Attorney, Agent, or Firm* — Birch, Stewart, Kolasch & Birch, LLP

(57) ABSTRACT

The present invention relates to a method for verifying the presence of equipment (E) on board an aircraft, the method comprising the following steps:—during a flight of the aircraft, implementing (102) radio communication tests by means of a device (2) on board the aircraft so as to determine an in-flight list of equipment consisting of any equipment having a quality of radio link with the radio communication device (2) higher than a first predetermined quality threshold;—after the flight, implementing (104) radio communication tests by means of the device (2) so as to determine a post-flight list of equipment consisting of any equipment having a quality of radio link with the radio communication device (2) higher than a second predetermined threshold after the flight;—generating (108) an alert when an item of equipment is present on the in-flight list and absent from the post-flight list.

14 Claims, 2 Drawing Sheets

(56) References Cited

U.S. PATENT DOCUMENTS

| | | | |
|---|---|---|---|
| 8,981,967 B1* | 3/2015 | Shore | B64F 5/00 |
| | | | 340/945 |
| 2007/0232164 A1 | 10/2007 | Swan et al. | |
| 2007/0266782 A1* | 11/2007 | Bartz | G06Q 10/087 |
| | | | 73/156 |
| 2017/0046543 A1* | 2/2017 | Shimada | G06K 7/10 |
| 2018/0229862 A1 | 8/2018 | Riera | |
| 2019/0318164 A1* | 10/2019 | Kumar | B64D 45/00 |

FOREIGN PATENT DOCUMENTS

| | | |
|---|---|---|
| FR | 3 088 621 B1 | 5/2020 |
| GB | 2482941 A | 2/2012 |

\* cited by examiner

METHOD FOR VERIFYING THE PRESENCE OF EQUIPMENT ON BOARD AN AIRCRAFT, AND ASSOCIATED DEVICE

FIELD OF THE INVENTION

The present invention relates to a method for verifying the presence of equipment on board an aircraft, and a device suitable for implementing a method of this type.

PRIOR ART

An aircraft such as an airplane comprises numerous items of equipment having various functions, often in several copies: lifejackets, extinguishers, etc.

Safety standards define which equipment must imperatively be located on board an aircraft, and in what number. If certain equipment came to be missing, an aircraft would not be allowed to take off.

Conventionally, a technician inspects, prior to a flight of an aircraft, that the expected equipment is in fact located on board the aircraft.

It is however possible that an item of equipment located on board the aircraft disappears (for example, a lifejacket or an extinguisher, etc.) or that an item of equipment necessitates periodic maintenance (for ex. an extinguisher must be recharged, etc . . . ). That is why it has been proposed to have technicians or operating personnel intervene repeatedly, typically between each flight of an aircraft, so that these technicians or operating personnel verify that the equipment initially placed on board the aircraft are still there.

Such interventions by technicians or operating personnel, however, are long and tedious. These technicians can therefore commit errors.

DISCLOSURE OF THE INVENTION

A goal of the invention is to verify the presence of equipment on board an aircraft in a more rapid and reliable manner.

A method for verifying the presence of equipment on board an aircraft is therefore proposed, according to a first aspect of the invention, the method comprising the following steps:
  during a flight of the aircraft, implementing radio communication tests by means of a device on board the aircraft, so as to determine an in-flight list of equipment consisting of any equipment having a quality of radio link with the radio communication device higher than a first predetermined quality threshold,
  after the flight, implementing radio communication tests by means of the device, so as to determine a post-flight list of equipment consisting of any equipment having a quality of radio link with the radio communication device higher than a second predetermined threshold after the flight,
  generating an alert when an item of equipment is present on the in-flight list and absent from the post-flight list.

The steps of the method according to the first aspect of the invention are implemented by a device which communicates by radio with the equipment identified. The lists of equipment are therefore established without having a technician intervene.

In addition, this method is founded on the idea that when the aircraft is on the ground, it is likely to be in proximity to much external equipment (equipment located aboard other aircraft or on the ground). The post-flight list is therefore likely to identify such external equipment. Moreover, it is only once the aircraft has landed that a person can leave the aircraft while taking with him an item of equipment of the aircraft. On the other hand, when the aircraft is in flight, it is far from connected equipment located outside the aircraft, and an item of equipment located on board the aircraft cannot leave the aircraft. The in-flight list of equipment therefore has a high probability of identifying only the equipment located on board the aircraft, and not equipment external to the aircraft. That is why the fact that an item of equipment is present on the in-flight list and absent from the post-flight list allows revealing that an item of equipment located on board the aircraft has left the aircraft after its landing.

For these reasons, the method according to the first aspect of the invention allows detecting rapidly and reliably that an item of equipment located on board the aircraft has disappeared.

The method according to the first aspect of the invention can also comprise the following optional features, taken alone or in combination when that is technically possible.

Preferably, the method comprises the steps of:
  counting a number of items of equipment present both on the in-flight list and on the post-flight list, and comparison of the number counted with a predetermined number of items of equipment,
  when the number counted is less than the predetermined number of items of equipment, generating an alert indicating that an insufficient number of items of equipment is located on board the aircraft.

Preferably, the device determines a type of this item of equipment for each item of equipment present on the in-flight list or on the post-flight list, in which the steps of counting and of comparison are implemented type by type.

Preferably, the type of an item of equipment is transmitted by this item of equipment to the device.

Preferably, the radio equipment system receives from a reference item of equipment an identifier belonging to this reference item of equipment, and in which the device determines the type of the reference item of equipment by interrogating a database associating equipment identifiers and equipment types.

Preferably, the method comprises an implementation of radio communication tests prior to the flight by the device, so as to determine a pre-flight list of equipment consisting of any equipment having a quality of radio link with the device higher than a third predetermined quality threshold prior to the flight, and in which the alert is generated when an item of equipment is present on the pre-flight list, present on the in-flight list, and absent from the post-flight list.

Preferably, the device (2) uses a first radio transmission power during tests implemented during the flight, and uses, during tests implemented before and/or after the flight, a second radio transmission power higher than or equal to the first radio transmission power, and/or the second quality threshold is less than or equal to the first quality threshold and/or to the third quality threshold.

Preferably, the method comprises, moreover, the following steps:
  for a reference item of equipment present in a list determined during an implementation of a radio communication test, calculating a delay elapsed since a preceding implementation of radio communication tests during which the reference item of equipment had a quality of radio link with the device higher than the predetermined quality threshold used during the preceding implementation, comparison between the elapsed delay and a predetermined shelf life of the item of equipment, generation of an alert indicating that the reference item of equipment is outdated when the elapsed delay is greater than the shelf life.

A system for verifying the presence of equipment on board an aircraft is also proposed according to a second aspect of the invention, the system for verifying the presence of equipment comprising a radio communication device configured to implement the following steps once on board the aircraft:

during a flight of the aircraft, implementing radio communication tests, so as to determine an in-flight list of equipment consisting of any equipment having a quality of radio link with the device higher than a first predetermined quality threshold, after the flight, implementing radio communication tests by the device so as to determine a post-flight list of equipment consisting of any equipment having a quality of radio link with the device higher than a second predetermined threshold after the flight, generating an alert when an item of equipment is present on the in-flight list and absent from the post-flight list.

Preferably, the radio communication device is configured to communicate with the equipment via a network of the LPWAN type.

DESCRIPTION OF THE FIGURES

Other features, goals and advantages of the invention will be revealed by the description that follows, which is purely illustrative and not limiting, and which must be read with reference to the appended drawings in which.

In all the figures, similar elements bear identical reference symbols.

DETAILED DESCRIPTION OF THE INVENTION

Figure 1:
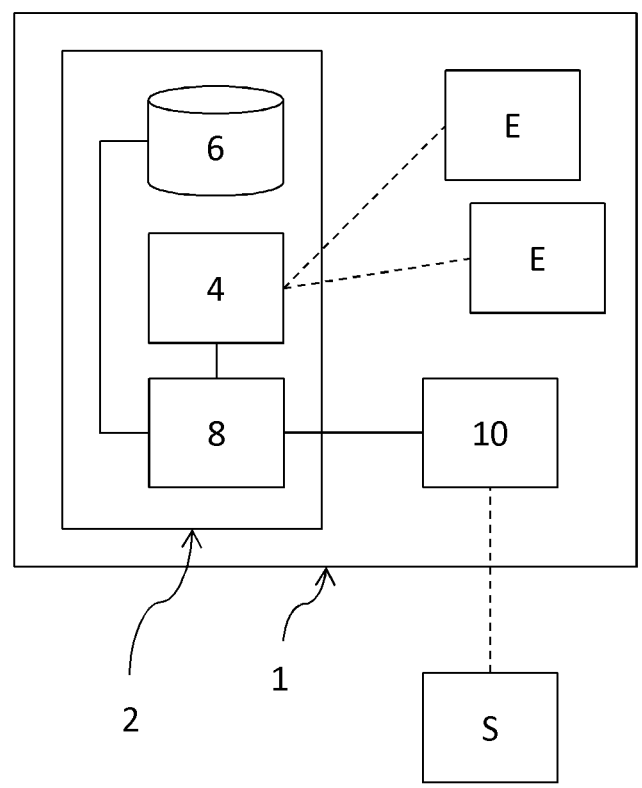
FIG. 1 illustrates schematically an aircraft comprising a system able to verify the presence of equipment on board this aircraft.

With reference to FIG. 1, an aircraft 1 comprises a system for verifying the presence of equipment on board this aircraft 1. In FIG. 1, two items of equipment E on board the aircraft are shown, but of course there can be more.

This system comprises a radio communication device 2.

The radio communication device 2 comprises at least one radio antenna 4.

The radio antenna 4 has the role of establishing communication channels with the equipment E located on board the aircraft 1 and constituting "connected objects".

The radio antenna 4 is preferably suitable for communication with such equipment E via a low power use IoT network (LPWAN for example), i.e. the data transmitted or received by the antenna 4 can have a structure compliant with a protocol of a low power use IoT network, for example LPWAN, Sigfox, LoRa, EnOcean or BLE (Bluetooth Low Energy). Of course, the radio antenna 4 can communicate directly or indirectly with an item of equipment via an ad hoc communication channel established according to one of these protocols, regardless of frequency.

The system also comprises a data processing unit 8 and a memory 6.

The memory 6 is configured to store data. It can comprise a volatile memory unit, for storing data until the radio communication device 2 is shut down, and a nonvolatile memory unit for storing data persistently storing data. The memory 6 can be part of the radio communication device 2.

The data processing unit 8 comprises at least one processor. It is configured to execute a computer program having as its function to verify the presence of equipment on board the aircraft 1. The processing unit 8 can be part of the radio communication device 2.

The system can also comprise an aeronautical radio communication device 10.

The aeronautical radio communication device 10 is configured to communicate with a ground station S when the aircraft 1 is in flight. It is known per se.

The aeronautical radio communication device 10 is for example configured to communicate with a ground station S by means of the communications means of the aircraft (for example Satcom, ACARS . . . ).

The aeronautical radio communication device 10 is for example configured to transmit radio signals in the Ku frequency band (microwave frequency band extending from 12 GHz to 18 GHz).

The radio communication device 2 is connected to the aeronautical radio communication device 10 via a local network of the aircraft 1, for example a wired local network, typically of the ARINC, Ethernet or AFDX type.

Hereafter, several phase of a flight of an aircraft 1 will be distinguished:

An "in-flight" phase: phase following a takeoff of the aircraft 1 and prior to a subsequent landing of the aircraft 1.

A "pre-flight" phase: this precedes the "in-flight" phase. It comprises at least one period during which all the persons to be transported aboard the aircraft 1 (flight personnel, passengers) have come aboard the aircraft 1, while the aircraft 1 is still on the ground.

A "post-flight" phase: this follows the "in-flight" phase. It comprises at least one period during which at least one transported person leaves the aircraft 1 after landing.

Figure 2:
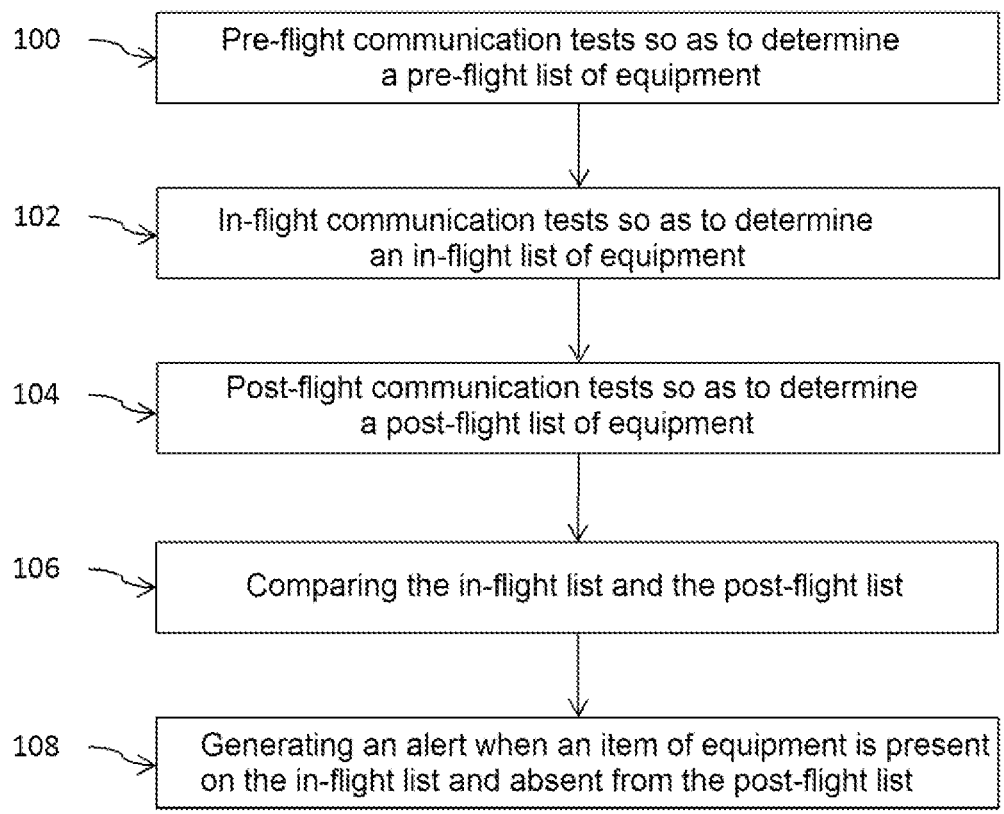
FIG. 2 is a flowchart of the steps of a method for verifying the presence of equipment on board an aircraft.

With reference to FIG. 2, a method for verifying the presence of equipment E on board the aircraft 1 comprises the following steps.

Prior to a flight, the radio communication device 2 implements, in a step 100, radio communication tests, so as to determine a pre-flight list of equipment consisting of any equipment having a quality of radio link with the radio communication device 2 higher than a first predetermined quality threshold. The list of equipment is called "pre-flight" in order to indicate that the list was established prior to the flight.

During these tests 100, in a first embodiment, the radio communication device 2 typically broadcasts a request inviting any equipment E in proximity to respond. To transmit the request, the radio communication device 2 uses a first transmitting power corresponding to the maximum allowed by law (for example 25 mW in the ISM band for Europe).

When an item of equipment within range receives a request of this type, this item of equipment responds to it by transmitting to the radio communication device 2 a response comprising a unique identifier belonging to this item of equipment. This identifier allows distinguishing the item of equipment E from any other equipment.

Thus the radio communication device 2 receives several responses transmitted by several items of equipment within range. The list of equipment comprises all the identifiers received in these responses.

In a second embodiment, the radio communication device 2 listens for messages from any equipment E in proximity.

The messages from the item of equipment E comprise an identifier belonging to the latter. This identifier allows distinguishing the item of equipment E from any other equipment.

Thus the radio communication device 2 receives several messages transmitted by several items of equipment within range. The list of equipment comprises all the identifiers received in these responses.

Optionally, the radio communication device 2 can determine, during the implemented tests 100, the type of each item of equipment having supplied its identifier. The type typically provides information regarding the function of the item of equipment. For example, the item of equipment can be of the "extinguisher" or "lifejacket" type.

For example, an item of equipment having stored its type in an internal memory 6 of this item of equipment can transmit its type in the response that it sends to the radio communication device 2. In this case, the response can comprise a header comprising the identifier of the transmitting item of equipment, plus a payload comprising the type of the transmitting item of equipment.

Alternatively, the processing unit 8 of the communication device having received an identifier can determine the type of the item of equipment concerned by interrogating a database associating equipment identifiers and equipment types. This database can be located in the memory 6 of the system, therefore being carried in the aircraft 1, or be stored remotely by a ground station S, in which case the interrogation of the database is implemented by means of the aeronautical communication device 10 of the aircraft 1.

During the implemented tests 100, the processing unit 8 of the radio communication device 2 retains only the identifiers of the equipment that communicate with the communication device with quality of radio link higher than the first quality threshold. Thus, an item of equipment located too far from the radio communication device 2, or in any case incapable of communicating with the communication device with the required level of quality, is not retained in the pre-flight list of equipment.

In practice, the quality of the link can be a link evaluation expressed in dBm or in time-of-flight of the message. A person skilled in the art knows how to estimate a link quality of this type.

For example, the processing unit 8 only takes into account, in forming the pre-flight list of equipment, only the equipment has a link evaluation greater than −20 dBm or a time of flight of less than 1 nanosecond.

Thereafter, the aircraft 1 takes off.

The radio communication device 2, and if applicable the equipment E on board the aircraft 1, detect that the aircraft 1 is in flight. This detection is for example implemented by means of an atmospheric pressure sensor or a movement sensor. The processing unit 8 and/or the equipment E consider that the aircraft 1 is in flight when an atmospheric pressure or a movement measured by the sensor surpasses a predetermined threshold.

The radio communication device 2 can also detect that the aircraft 1 is in flight by recovering this information by means of the link to the local wired network of the aircraft 1.

In response to a detection of this type (therefore during the flight of the aircraft 1), the radio communication device 2 again implements radio communication tests in a step 102, so as to determine an in-flight list of equipment consisting of any equipment having a quality of radio link with the device higher than a second predetermined quality threshold.

The tests 102 implemented during the flight are similar to the tests 100 implemented prior to the flight.

The second quality threshold used for the tests 102 can be equal to the first quality threshold used during the tests 100. Preferably, the second threshold is strictly less than the first test threshold.

The radio communication device 2 and, if applicable, the equipment E uses a second transmission power to transmit their radio messages.

The second transmission power can be equal to the first power. Preferably, the second transmission power is strictly less than the first transmission power. This reduction of power relative to the power used prior to the flight has the effect of reducing possible perturbations caused by the communication tests implemented during the flight on communications between the aircraft 1 and a ground station by means of the aeronautical communication device 10 as well as on the sub-systems of the aircraft 1.

Preferably, the second power is adjusted so as to satisfy the RTCA DO-160 issue G-section 21 category H standard.

It is possible that equipment was identified in the pre-flight list that was not on board the aircraft 1, but that was located on the ground or on board another aircraft 1 in proximity to the aircraft 1, during the tests implemented prior to the flight. These items of equipment are false positives. The aircraft 1 is much farther away from such false positives when it is in flight. That is why the in-flight list of equipment is more representative of the equipment genuinely located on board the aircraft 1 than is the pre-flight equipment list.

On the other hand, it is possible that certain equipment located on board the aircraft 1, duly detected during the nominal power communication tests prior to the flight, are no longer detected during the tests implemented during the flight. This can occur in particular when the second transmission power is too weak; the threshold must be specific for each airplane and obtained by modeling the propagation conditions for a given type of airplane.

Thereafter, the aircraft 1 lands.

After the flight, the radio communication device 2 again implements radio communication tests in a step 104, so as to determine a list of equipment called "post-flight," consisting of any equipment having a quality of radio link with the device higher than a predetermined quality threshold.

The tests 104 after the flight are implemented at least once after the aircraft 1 has been opened and an item of equipment located on board the aircraft 1 is likely to leave the aircraft 1, for example because it is stolen by a passenger or a member of the operating personnel.

The tests 104 implemented after the flight are similar to the tests 100 implemented prior to the flight.

In particular, the third quality threshold used during the tests 104 can be the same as the first quality threshold used during the tests implemented prior to the flight.

The radio communication device 2 uses a third transmission power to transmit the request during the tests after the flight.

The third transmission power is preferably different from the second transmission power used during the flight. The third transmission power is for example equal to the first transmission power used prior to flight.

The processing unit 8 compares the in-flight list and the post-flight list (step 106).

When the processing unit 8 detects that an item of equipment is present on the in-flight list but is absent from the post-flight list, the processing unit 8 generates an alert (step 108). An alert of this type allows notification that an item of equipment which was located on board the aircraft 1 has been stolen.

This detection can be carried out in several ways.

The processing unit 8 can for example count the number of identifiers of the in-flight list, and the number of identifiers in the post-flight list. If the number of identifiers of the post-flight list is less than the number of identifiers of the in-flight list, that signifies that at least one item of equipment has left the airplane and the alert is generated.

Alternatively, the processing unit 8 can rely upon the values of the identifiers identified in the in-flight list and in the post-flight list. If a value of an identifier is found in the in-flight list, but is not found in the post-flight list, the alert is generated. In this variant embodiment, the identifier of the missing item of equipment can be reported in the alert generated.

The pre-flight list can also be called upon to determine if an alert is to be generated or not during step 108.

For example, the processing unit 8 generates an alert when an item of equipment:
- is present in the pre-flight list, present on the in-flight list and absent from the post-flight list;
- if an item of equipment is in the aircraft for a period longer than its shelf life;
- if an item of equipment sees its evaluation collapse for no reason (currently moving away from the aircraft);
- if an item of equipment indicates a state of failure (use of the "payload" of each item of equipment to send information, such as "lifejacket open" for example).

An alert generated by the processing unit 8 is typically transmitted to a ground station such as the station S so as to inform the maintenance teams on the ground, and/or to an on-board computer so as to inform the operating personnel of the aircraft 1.

The steps 100, 102, 104, 106, 108 detailed above are repeated for several successive flights of the aircraft 1.

The in-flight and post-flight lists can be operated for other purposes than a simple detection that an item of equipment has left the aircraft 1 after a landing of the latter.

Safety standards impose a minimum number of certain equipment on board an aircraft 1. Thus, an aircraft not having equipment in sufficient number would not be allowed to fly.

The processing unit 8 can then count the number of items of equipment present both on the in-flight list and on the post-flight list, and compare this number counted with a predetermined number of items of equipment. When the number counted is less than the predetermined number of items of equipment, the radio communication device 2 generates an alert indicating that an insufficient number of items of equipment is located on board the aircraft 1.

These steps are particularly advantageous when the system knows the types of the different items of equipment detected during and after the flight. In this case, the steps of counting and comparison are implemented per type of equipment by the processing unit 8. The absence or the insufficiency on board of equipment of a certain type can prove to be critical, while the absence of other equipment is of less importance. For example, a lack of lifejackets is considered critical. Implementing the steps of counting and comparison, type by type, allows generating alerts that are much more detailed and relevant, particularly distinguishing situations in which the aircraft 1 must imperatively be re-provisioned with equipment of critical type for flying again.

Moreover, safety standards define a shelf life for certain types of equipment. In other words, an item of equipment of a given type located on board the aircraft 1 for too long is considered worn out and must imperatively be replaced.

The tests implemented by the communication device can advantageously be used for detecting that an item of equipment on board the aircraft 1 is outdated.

To this end, the communication device time-stamps the communication tests that it implements (before a flight and/or during a flight and/or after a flight).

Consider an item of equipment called "reference item of equipement" transmitting a response to the communication device during an implementation of tests.

On receipt of this response, the processing unit 8 orders storage in the memory 6 of the date at which the response was received, called the current date.

Moreover, the processing unit 8 verifies whether the memory 6 also contains an earlier date at which the reference item of equipment was retained in a list of equipment in the past, during a preceding implementation of tests (typically before, during or after an earlier flight of the aircraft 1).

The processing unit 8 calculates the delay elapsed since this earlier date (the difference between the current date and the earlier date).

The radio processing unit 8 compares the elapsed delay and a predetermined equipment shelf life (this shelf life being for example dependent on the type of equipment).

The processing unit 8 generates an alert indicating that the reference equipment is outdated when the elapsed delay is greater than the predetermined shelf life.

Typically, the predetermined shelf life and the predetermined numbers of equipment for different types of equipment are data that are found in an MEL ("Minimum Equipment List").

The invention claimed is:

1. A method for verifying the presence of equipment on board an aircraft, the method comprising:
   during a flight of the aircraft, implementing radio communication tests by means of a device on board the aircraft, so as to determine an in-flight list of equipment consisting of items of equipment having a quality of radio link with the radio communication device higher than a first predetermined quality threshold,
   after the flight, implementing radio communication tests by means of the device, so as to determine a post-flight list of equipment consisting of items of equipment having a quality of radio link with the radio communication device higher than a second predetermined quality threshold after the flight,—generating an alert when an item of equipment is present on the in-flight list of equipment and absent from the post-flight list of equipment.

2. The method according to claim 1, further comprising:
   counting a number of items of equipment present both on the in-flight list of equipment and on the post-flight list of equipment, and comparing the number with a predetermined number of items of equipment,
   when the number counted is less than the predetermined number of items of equipment, generating an alert indicating that an insufficient number of items of equipment is located on board the aircraft.

3. The method according to claim 2, comprising determining, by the device, a type of this item of equipment for each item of equipment present on the in-flight list of equipment or on the post-flight list of equipment, wherein the steps of counting and of comparing are carried out type by type.

4. The method according to claim 3, wherein the type of an item of equipment is transmitted by said item of equipment to the device.

5. The method according to claim 4, comprising receiving, by the radio equipment system and from a reference item of equipment, an identifier belonging to said reference item of equipment, and determining, by the device, the type of the reference item of equipment by querying a database associating equipment identifiers and equipment types.

6. The method according to claim 1, comprising implementing radio communication tests prior to the flight by the device, so as to determine a pre-flight list of equipment consisting of items of equipment having a quality of radio link with the device higher than a third predetermined quality threshold prior to the flight, wherein the alert is generated when an item of equipment is present on the pre-flight list of equipment, present on the in-flight list, and absent from the post-flight list.

7. The method according to claim 6, wherein:
the device uses a first radio transmission power during the radio communication tests implemented during the flight, and uses a second radio transmission power during the radio communication tests implemented before the flight, wherein the second radio transmission power is higher than or equal to the first radio transmission power.

8. The method according to claim 6, wherein the first predetermined quality threshold is less than or equal to the third predetermined quality threshold.

9. The method according to claim 1, wherein:
the device uses a first radio transmission power during the radio communication tests implemented during the flight, and uses a second radio transmission power during the radio communication tests implemented after the flight, wherein the second radio transmission power is higher than or equal to the first radio transmission power.

10. The method according to claim 1, wherein the first predetermined quality threshold is less than or equal to the second predetermined quality threshold.

11. The method according to claim 1, further comprising:
for a reference item of equipment present in the in-flight list of equipment or in the post-flight list of equipment, calculating a delay elapsed since a preceding implementation of radio communication tests,—comparing the delay with a predetermined shelf life of the item of equipment,
generating an alert indicating that the reference item of equipment is outdated when the elapsed delay is greater than the shelf life.

12. The method according claim 1, wherein the device communicates with the equipment via an IoT type network.

13. The method according claim 1, wherein the device communicates with the equipment via a LPWAN network.

14. A system for verifying the presence of equipment on board an aircraft, the system for verifying the presence of equipment comprising a radio communication device configured to implement the following steps once on board the aircraft:
during a flight of the aircraft, implementing radio communication tests, so as to determine an in-flight list of equipment consisting of items of equipment having a quality of radio link with the device higher than a first predetermined quality threshold,
after the flight, implementing radio communication tests by the device so as to determine a post-flight list of equipment consisting of items of equipment having a quality of radio link with the device higher than a second predetermined threshold after the flight,
generating an alert when an item of equipment is present on the in-flight list of equipment and absent from the post-flight list of equipment.

* * * * *